US006233574B1

(12) United States Patent
Ladwig et al.

(10) Patent No.: US 6,233,574 B1
(45) Date of Patent: *May 15, 2001

(54) METHOD AND APPARATUS FOR PERFORMING RADIX LOOKUPS USING TRANSITION TABLES WITH POINTERS

(75) Inventors: Geoff Ladwig, Chelmsford; Richard Angle, Wellesley, both of MA (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/108,751

(22) Filed: Jul. 1, 1998

(51) Int. Cl.[7] ................................................. G06F 17/30
(52) U.S. Cl. .............................. 707/4; 707/100; 707/101; 707/102
(58) Field of Search ............................... 707/4, 100, 101, 707/102, 103, 104

(56) References Cited

U.S. PATENT DOCUMENTS

| | | | | |
|---|---|---|---|---|
| 5,355,473 | * | 10/1994 | Au ........................................ | 707/103 |
| 5,546,390 | * | 8/1996 | Stone .................................. | 707/101 |
| 5,651,099 | * | 7/1997 | Konsella ............................. | 707/104 |
| 5,829,004 | * | 10/1998 | Au ........................................ | 707/100 |
| 5,857,196 | * | 1/1999 | Angle et al. ........................ | 707/102 |
| 5,873,078 | * | 2/1999 | Angle et al. ............................ | 707/3 |

OTHER PUBLICATIONS

Knox et al., Parallel Searching Techniques for Routing Table Lookup, IEEE, pp. 1400–1405, Apr. 1993.*

Wang et al., Searching Algorithm of the Optimal Radix of exponential Bidirectional Associative Memory, IEEE, pp. 1137–1142, Jun. 1994.*

Reznick, LZRW1 Without Hashing, IEEE, p. 569, Mar. 1998.*

Wang et al., Analysis of Radix Searching of Exponential Bidirectional Associative Memory, IEEE, pp. 279–285, Jul. 1998.*

Robert Sedgewick, Algorithms (Radix Searching), Addison–Wesley Publishing Company, pp. 213–223. 201–210, 1983.*

* cited by examiner

*Primary Examiner*—Thomas Black
*Assistant Examiner*—Frantz Coby
(74) *Attorney, Agent, or Firm*—Blakely Sokoloff Taylor & Zafman LLP

(57) ABSTRACT

A method, apparatus, and article of manufacture for performing a radix search tree lookup with a key using a transition table with pointers. The key is used as a transition index into the transition table. A first pointer associated with the transition index is then used as a pointer into a first block of entries in a result table. A sum of transition bits in the transition table below the transition index is used as a result index into the first block of entries in the result table. The result index into the first block of entries may be used to reference a result of the radix search tree lookup. Extra space is added in the result table to enable insertion of entries after the first block of entries. A second pointer is used to add redundant entries from the first block of entries into a second block of entries in the result table.

16 Claims, 12 Drawing Sheets

METHOD AND APPARATUS FOR PERFORMING RADIX LOOKUPS USING TRANSITION TABLES WITH POINTERS

FIELD OF THE INVENTION

This invention relates generally to data communications networks, and more particularly, to a method and apparatus for performing radix search tree lookups using transition tables with pointers.

BACKGROUND OF THE INVENTION

There are numerous known methods for searching for data in a data structure stored in a memory of a computer system to find a particular item of information. It is desirable to implement methods for organizing and searching for data in the data structure in a way that reduces the amount of memory required to store the data and perform the search in a more efficient manner.

A table or a file is a group of data elements, each of which may be called an entry or a record in the table. Generally, a key is associated with each record. The key is used to differentiate among different records. The key associated with a particular record may or may not need to be unique, depending on the search method utilized in accessing the table. In addition, the key may or may not be embedded within the record itself.

A search method accepts a key value as input and attempts to locate a record within a table stored in the memory of a computer system whose associated key is the key value. The search method may return a record, or a pointer to the record. The contents of the record may be data, program code, or a pointer to either data or program code. If the search of a table is unsuccessful in finding the key, then there is no record in the table associated with the key value. Typically, if the search is unsuccessful, an insertion is performed to add a new record with the key value as its key.

A table is stored in a data structure in the memory or an external storage, e.g., magnetic disk, of a computer system. The form of the data structure may be an array of records, a tree, a linked list, etc. Certain search methods are generally more applicable to one form and location of a data structure than another. Thus, the data structure in which a table is stored is, in part, selected according to the search method to be used to access information within the table. The present invention is related to search operations on a file or table that is organized as a tree structure.

One known search method utilizes a tree to facilitate searching a table stored in the memory of a computer system. This search method forms a tree based on symbols of which the keys are comprised. This is generally referred to as a radix search tree. For example, if the key is comprised of the hexadecimal characters 0 through F, each successive hexadecimal digit position in the key determines 1 of 16 possible children of a given node in the tree.

When the set of keys in a table is sparse, known methods of storing a table of keys in a tree for later radix searching wastes a large amount of memory space. Therefore, there is a need for a way of storing information in a tree structure in the memory of a computer system and for subsequently searching the tree such that the amount of memory required to store a sparse table of keys is minimized. There is a further need for searching a tree in the memory of a computer system in a fast, efficient manner.

SUMMARY OF THE INVENTION

The present invention provides a method, apparatus, and article of manufacture for performing a radix search tree lookup with a key using a transition table with pointers. The key is used as a transition index into the transition table. A first pointer associated with the transition index is then used as a pointer into a first block of entries in a result table. A sum of transition bits in the transition table below the transition index is used as a result index into the first block of entries in the result table. The result index into the first block of entries may be used to reference a result of the radix search tree lookup. Extra space is added in the result table to enable insertion of entries after the first block of entries. A second pointer is used to add redundant entries from the first block of entries into a second block of entries in the result table.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

Hardware Environment

Figure 1:
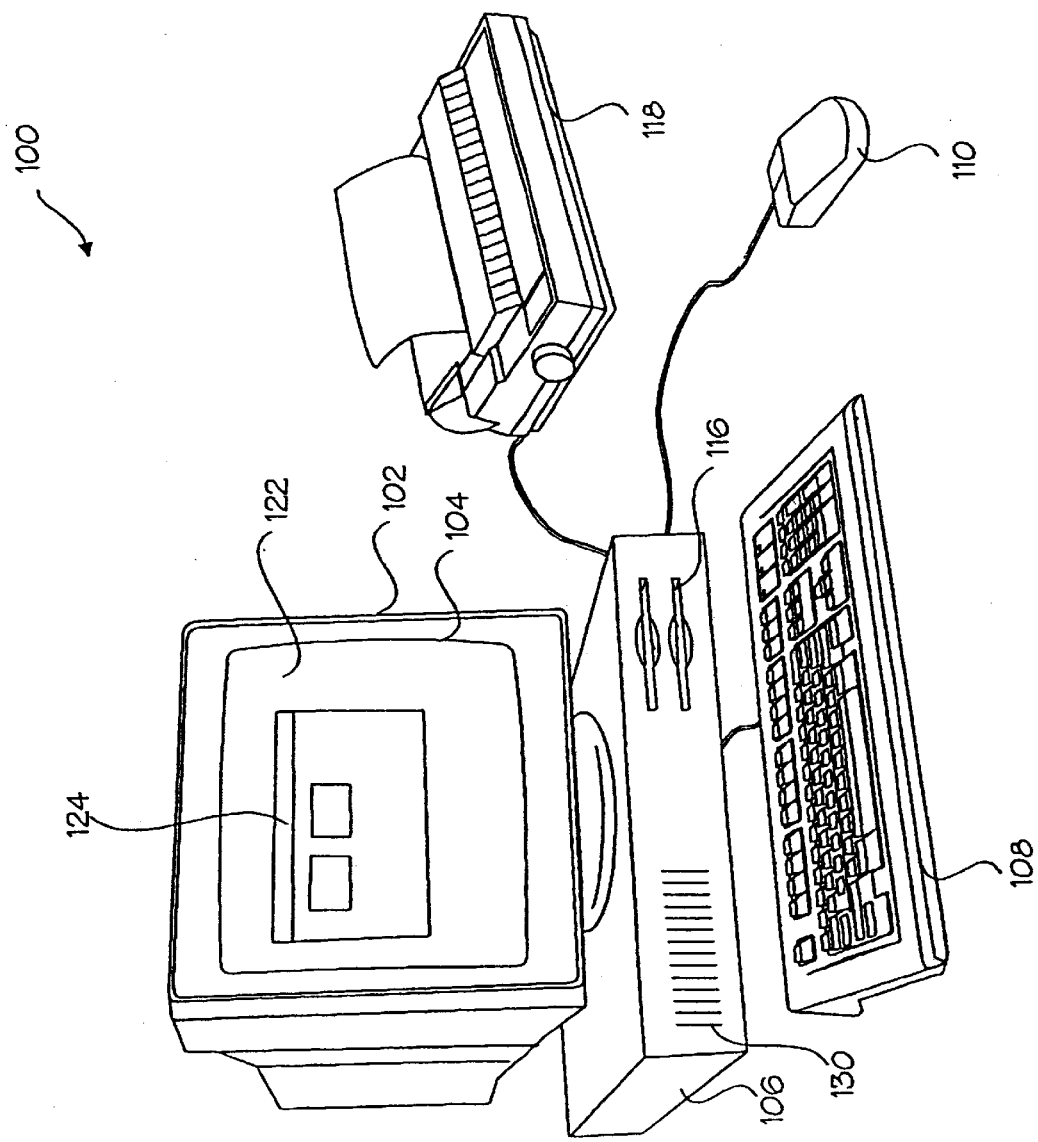
FIG. 1 is a system diagram which shows a computer hardware environment compatible with the present invention.

FIG. 1 shows a computer hardware environment that could be used with the present invention. The present invention is typically implemented using a computer 100, wherein the computer 100 comprises a processor 106, random access memory (RAM) 130, and read-only memory (ROM) and/or other components. The computer 100 may be coupled to I/O devices, such as a monitor 102, keyboard 108, mouse device 110, fixed and/or removable data storage devices 112 and 114, and printer 118. The computer 100 could also be coupled to other I/O devices, including a local area network (LAN) or wide area network (WAN) via interface cable 120. Those of ordinary skill in the art will recognize that any combination of the above components, or any number of different components, peripherals, and other devices, may be used with the computer 100.

Generally, the computer 100 operates under control of an operating system 122, which is represented by the display 104 on the monitor 102. The present invention is preferably implemented using one or more computer programs or applications 124, which are represented by the window displayed on the monitor 102 operating under the control of the operating system 122. The operating system 122 and computer program 124 are loaded from a data storage devices 112 and/or 114 into the memory 130 of the computer 100 for use during actual operations.

In the preferred embodiment of the present invention, the operating system 122 and the computer program 124 are useably embodied in a computer-readable medium, e.g., data storage devices 112 and/or 114 which could include one or more fixed or removable data storage devices, such as a floppy disk drive, hard drive, CD-ROM drive, tape drive, etc. Further, the operating system 122 and the computer program 124 are comprised of instructions which, when read and executed by the computer 100, causes the computer 100 to perform the steps necessary to implement and/or use the present invention. Those of ordinary skill in the art will recognize that many modifications may be made to this configuration, including the number, size, and types of components, without departing from the scope of the present invention.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

Valid Bit Tables

Figure 2:
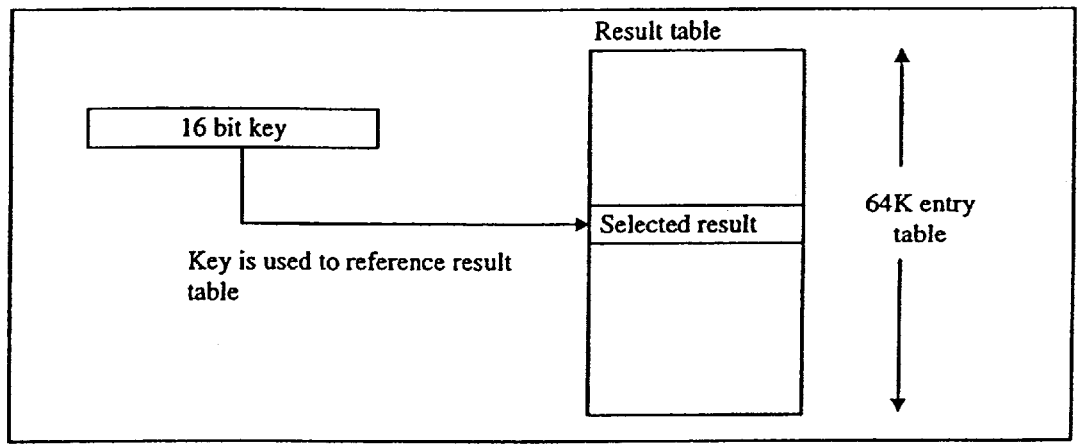
FIG. 2 shows a simple radix lookup compatible with the present invention.

A radix lookup uses a key or pieces of a key as an address into a table, as shown in FIG. 2. For example, if a 16 bit key were being looked up, a 64K entry table of results would be referenced by the entire key. The value in the table is the result of the lookup.

If the desired result is large, the result table can become quite large. This becomes especially wasteful if the table is sparsely populated. If this is the case, it is desirable to shrink the size of the result entries.

Figure 3:
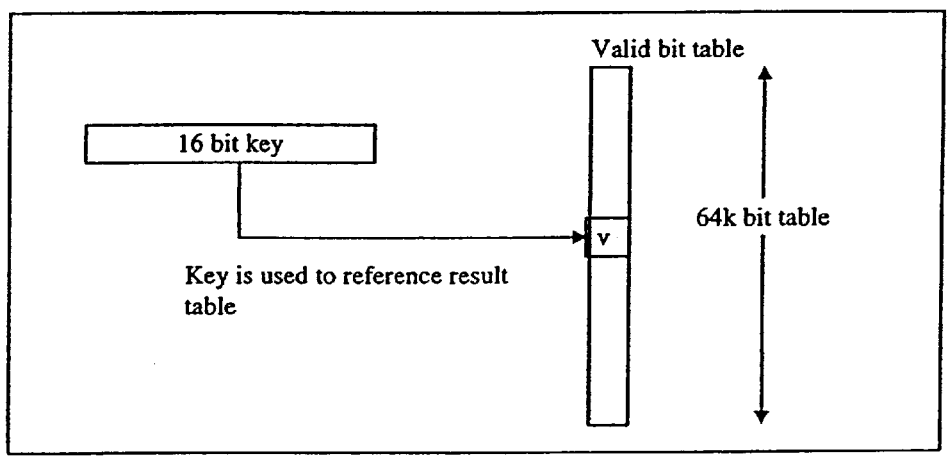
FIG. 3 shows a simple radix lookup with valid bit table compatible with the present invention.

In a valid bit table, the only result is if the entry is valid or not, as shown in FIG. 3. A single bit is sufficient to do this. In this case, the result table would have 64K entries and each entry would be a bit. The bit would be referenced with the key as before and the result would indicate if the key were valid or not.

Figure 4:
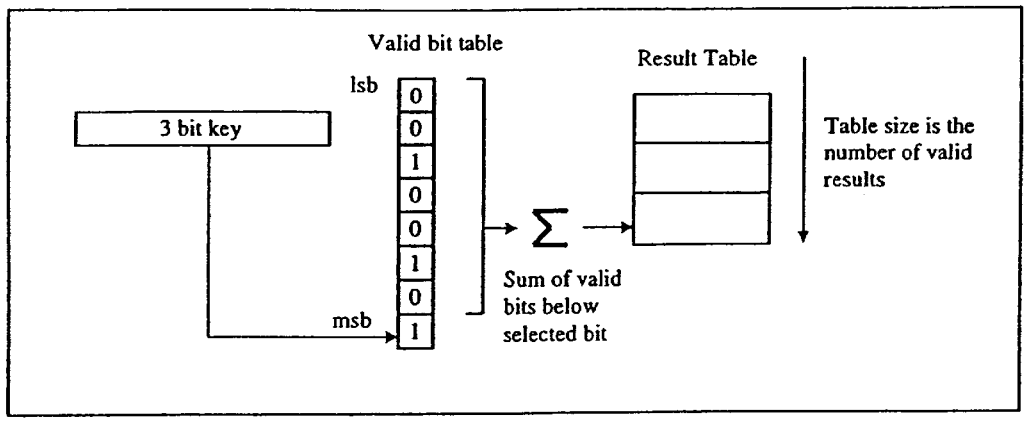
FIG. 4 shows a valid bit table with compressed result table compatible with the present invention.

The valid bit table wastes very little space on invalid results because only a single bit is used, but does not provide a large result for valid entries. To improve on this, an additional table can be added that only contains the results for valid entries, as shown in FIG. 4. Valid entries are accessed in the following manner. The result table contains as many entries as there are valid results. An entry that is at location N in the result table is associated with the valid bit that is the Nth valid bit in the bit table. To determine the location of a result given a valid bit, the valid bits from N−1 to 0 must be summed. For example, in an 8 entry bit table with 3 valid results corresponding to a key of 2, 5 and 7, a key of 7 would result in the bit table being referenced at bit 7. The fact that bit 7 is set indicates the entry is valid and the result is available. Bit 7 is the third valid bit that is set. The result for bit 7 must be the third entry in the result table at location 2, counting addresses from 0. The value 2 is computed by summing all the valid bits below the valid bit selected.

Figure 5:
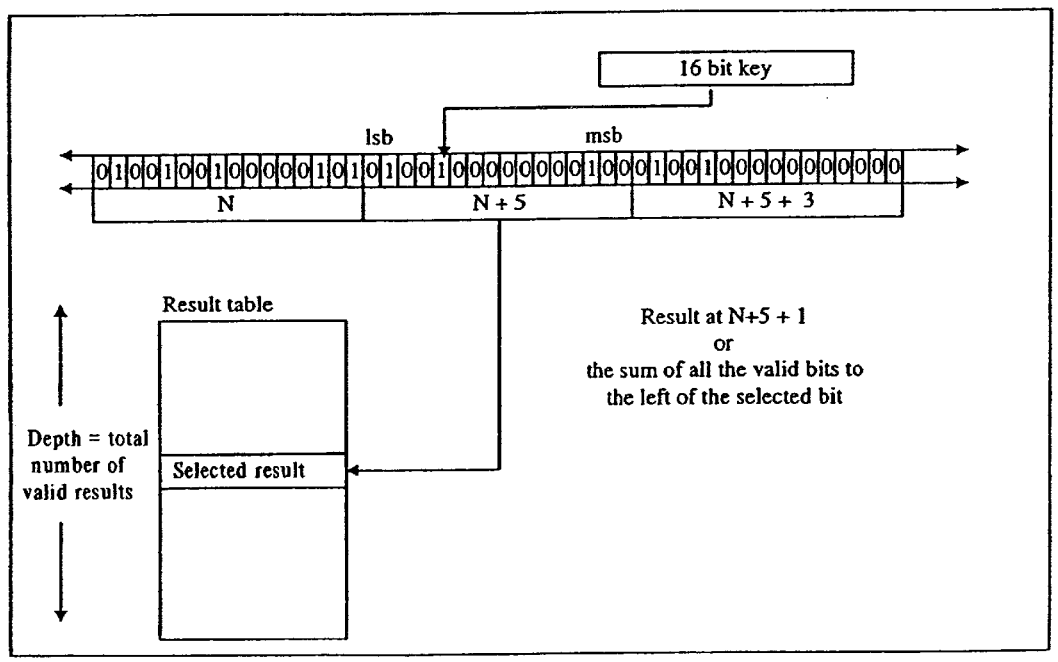
FIG. 5 shows a 64 Kbit valid bit table with count compatible with the present invention.

This method can be extended to large bit strings as in the previous example. The problem then becomes that the summation of all the valid bits below the bit selected may require a large number of memory accesses. This problem can be solved by keeping a count along with the bit string at even intervals that records the number of valid entries to that point, as shown in FIG. 5. The address of the result is then the sum of the count plus the number of one's beyond the count but below the bit selected. An example of this is a 64 Kbit string with count values every 16 bits. The count value must be at most 16 bits long to cover the possible 64 Kbit results. This is shown pictorially in FIG. 5, which for convenience, shows the bit field rotated.

In the example shown in FIG. 5, N is the count value of the bit field above it. N is the count or sum of all the valid entries to the left of the segment. The result entry is then the count field plus the bits in the selected bit field segment that are to the left of the selected bit. The sizes of 16 bits of valid and a 16 bit offset are not required. The count must be large enough to account for the maximum number of results. The bit field associated with the count may be as large as convenient. 16 bits is convenient because both the field and the count can be read in a single 32-bit memory reference.

Figure 6:
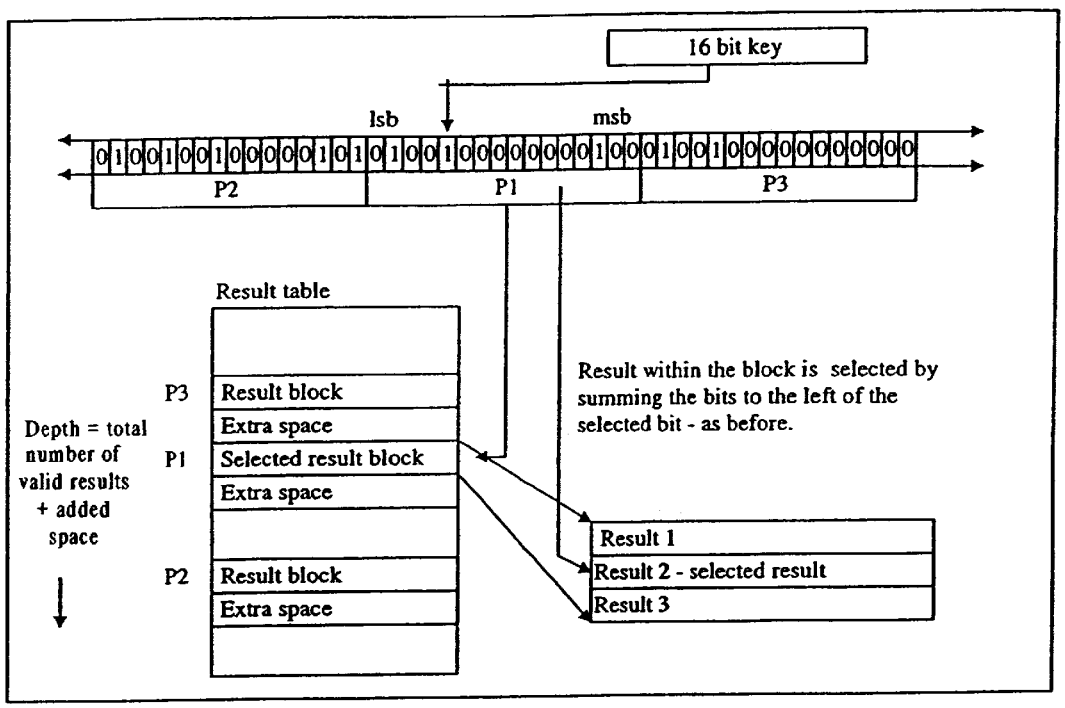
FIG. 6 shows a 64 Kbit valid bit table with pointers compatible with the present invention.

The result arrangement described above provides for the efficient use of memory. It is effective in tables with a large number of entries since there is a fixed overhead associated with the bit field and count representation. One problem with this type of arrangement is the difficulty in adding or removing entries from the table. Adding an entry to the beginning of the table would force all of the counts after the addition to be incremented by one. One way of improving this is to replace the count by a simple pointer, as shown in FIG. 6. The pointer points to a block of memory allocated for that pointer/bit field. The block is at least as large as the number of valid entries associated with that bit field. For example, if a pointer/bit field had a bit field that was 01001001001000101 which has 6 valid results, the pointer would point to a block of 6 consecutive entries in the result table. To allow for adding and deleting entries, space is allocated between these blocks. The fact that a pointer is used, rather than a count, is what allows space to be added between blocks. Because a pointer is used, the result blocks may be placed anywhere in the result table.

Valid Bit Tables with Hashing

Figure 7:
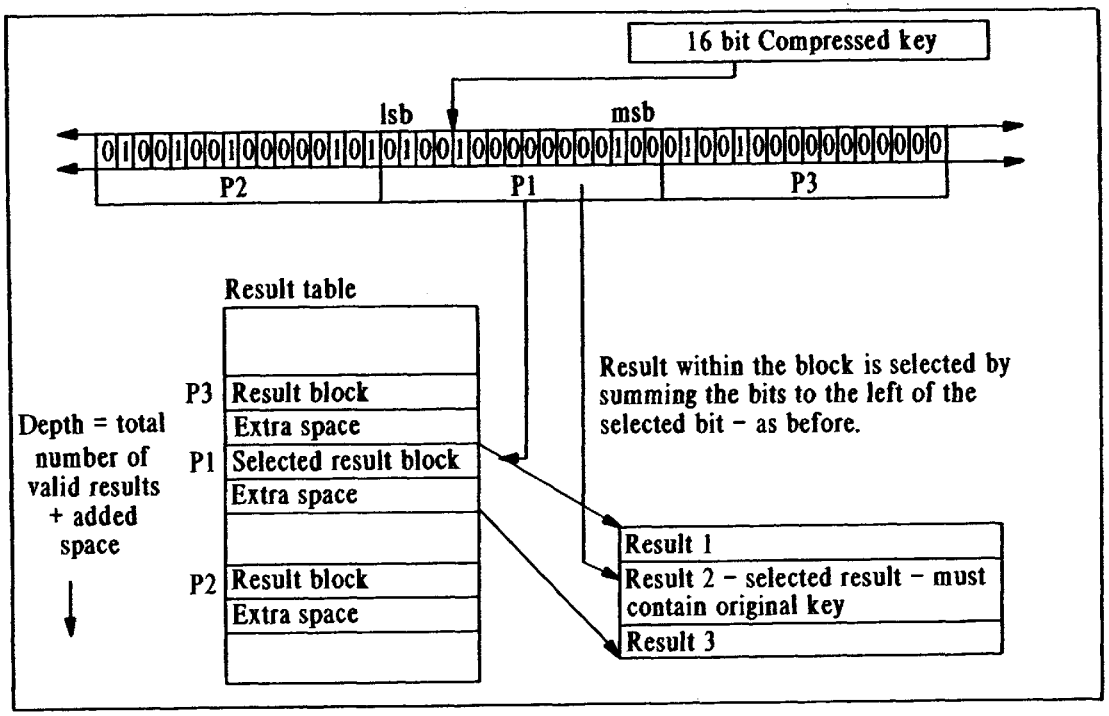
FIG. 7 shows a valid bit table with hashing compatible with the present invention.

Hashing may also be used for performing lookups. In hashing, the key is compressed by using a hash function and the compressed value is then used to reference a table of results, as shown in FIG. 7. Included in the result is a bit indicating the result is valid and a full copy of the key the entry represents. The key is required in the result because the compression may result in multiple keys hashing to the same location. To reduce the chance of hashing to the same location, hash tables are typically larger than the number of results. A result table that is three times larger than the number of results is typical. Even larger tables would further reduce the chance of collisions.

Valid bit tables can be used to reduce the required storage of hash results. This is accomplished by replacing the normal key with a compressed key. No other changes are required. The selected result must include a full key to compare against the original key.

Transition Bit Tables

The ability to represent ranges within a table is useful in packet-switched networking applications. The valid bit method described above does not represent ranges very well. For example, if a range of 0x4560 to 0x456f were represented with the valid bit scheme, it would require 16 duplicate entries in the result table, one for 0x4560, one for 0x4561 and so on.

Figure 8:
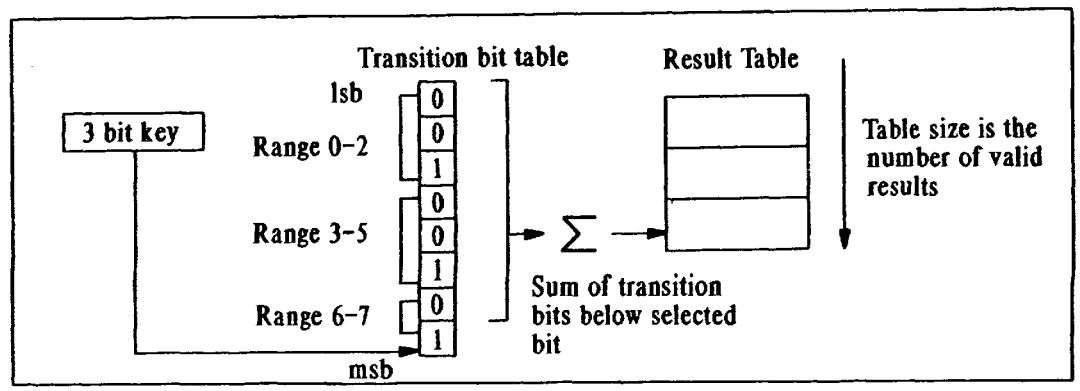
FIG. 8 shows a transition bit table example compatible with the present invention.
Figure 9:
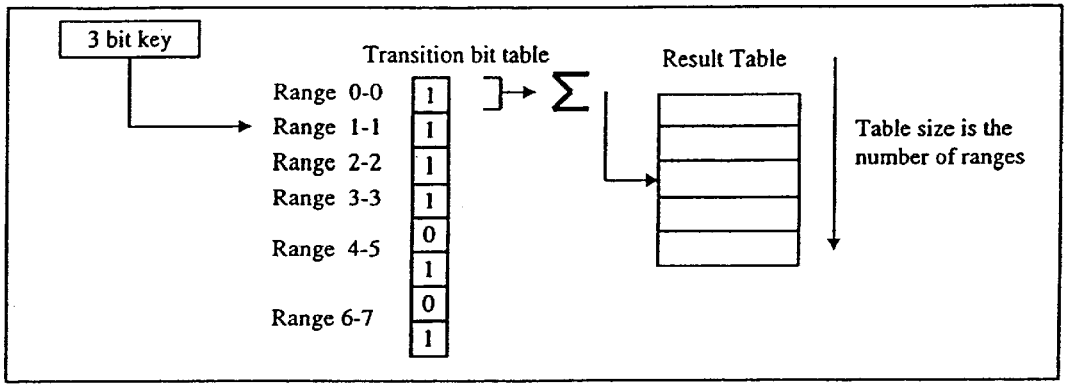
FIG. 9 shows a transition table representing single entry ranges compatible with the present invention.

An improvement on this method represents transitions in the bit field rather than valid or invalid entries shown in FIG. 8. A one in the bit field indicates the end of a range rather than a single valid entry. The mechanics of computing the address of the result corresponding to the range are nearly the same as the case of the valid bit tables. Because a one in the bit field indicates the end of a range, this also indicates a transition to a new result. The offset of a result is then obtained by summing the number of 1's to the left, or the least significant bits (LSB), of the selected bit. This is the same process as used with valid bits. The only difference is that in a transition bit table, there is no "invalid" entry, every range has a result, even if the result will indicate the range is invalid. An example is shown in FIG. 8. In the example, three ranges are represented, 0–2, 3–5, 6–7. A key of 7 would result in the transition field being referenced at bit 7. The transition bits over the range 0–6 in the transition bit table are summed to provide the offset of 2, counting from 0, into the result table. FIG. 9 shows an example of how a transition table represents a range of one as indicated by the ranges 0—0, 1—1, 2—2, and 3—3.

Figure 10:
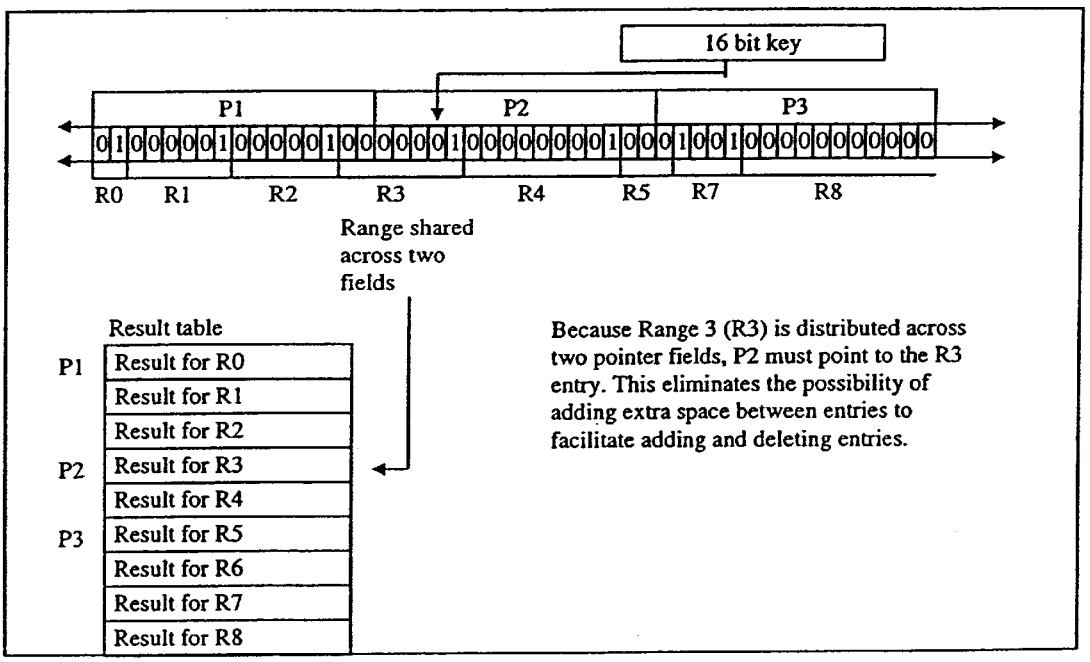
FIG. 10 shows a 64 Kbit transition bit table with pointers with forced adjacencies compatible with the present invention.

As with the valid bit tables, the transition bit tables can be used to represent larger tables. As with the methods described above, this creates a need for an additional count field to prevent the need to sum all bits below the selected bit. Transition tables also suffer from the problem that the table is difficult to update because all the count fields above a new or deleted entry must be adjusted when making changes. This problem can be alleviated by using pointers rather than counts, as shown in FIG. 10.

Using pointers in a transition table is not quite as effective as is the case in the valid bit tables, because unlike a valid bit table, the leading zero's in a transition bit table have a result. The result is the same result as any trailing zero's in the previous field. This forces the pointer in the second field to point to the trailing entry in the result table of the first field and eliminates the ability to add empty space between entries.

Figure 11:
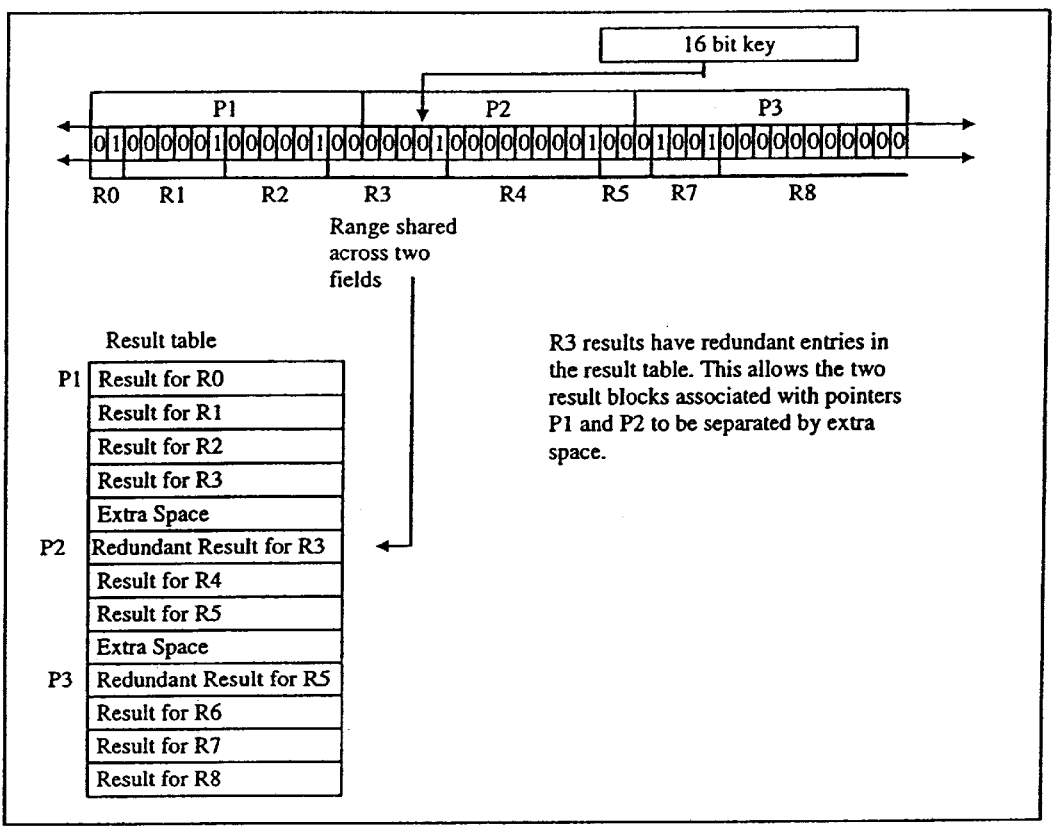
FIG. 11 shows a 64 Kbit transition bit table with pointers with redundant entries compatible with the present invention.

The inability to add empty space between entries may be corrected by adding additional redundant entries when separating two regions with shared results, as shown in FIG. 11. While this requires additional memory, the benefits gained by allowing easy insertion and deletion are typically considered acceptable by system designers.

Hardware Implementation

Figure 12:
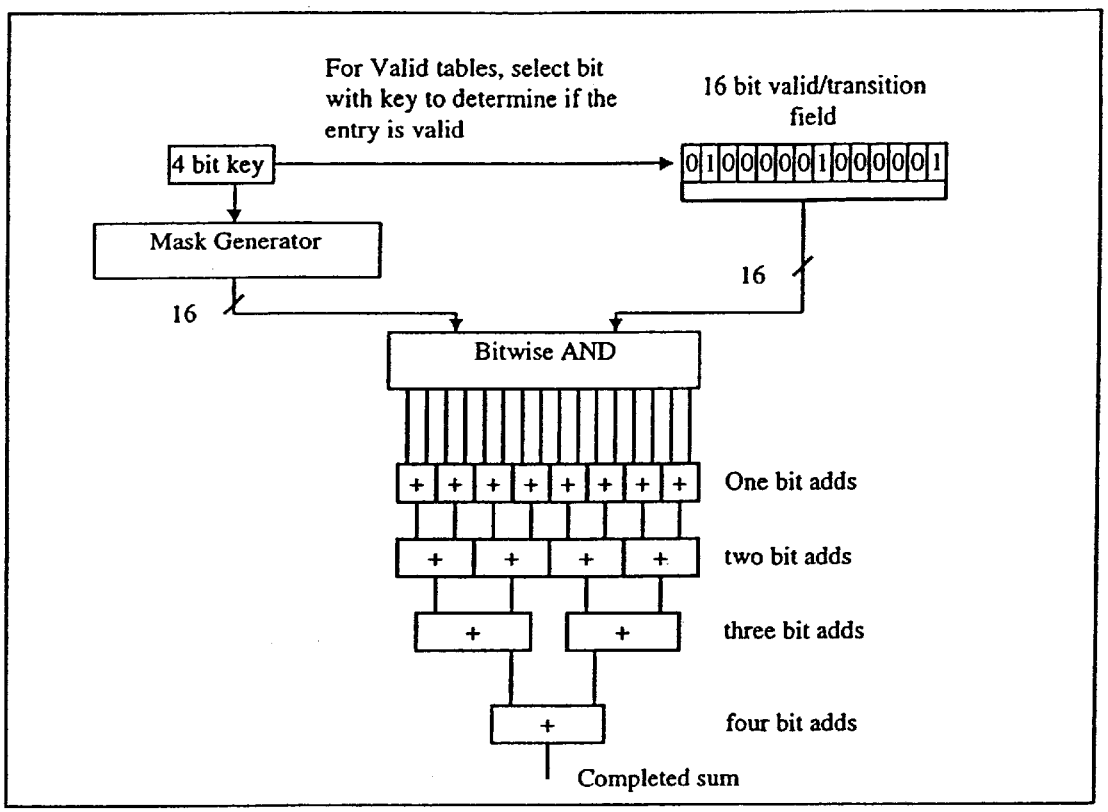
FIG. 12 shows a block diagram of a hardware implementation compatible with the present invention.

One key to the efficient implementation of the present invention is the ability to quickly sum all the bits in a field left of the selected bit. The example shown in FIG. 12 demonstrates the method for a 4 bit key and 16 bit field. It will be recognized by one of ordinary skill in the art that this method can be applied to any n bit key and 2**n bit field. For valid bit tables, the bit selected by the key must be checked. If the bit is set, it is a valid entry. If the bit is not set, the entry is invalid and no further work is required. Transition bit tables do not perform this check. The key is used to generate a mask. The mask generated has all the bits set to one which are less significant than the bit selected by the key. For example, if the key were 5, the mask generated would be 1111100000000000, where the LSB is on the left. The mask and the bit field are bitwise ANDed together which produces a value with only those bits less significant than the selected bit set. These bits are summed to produce the desired result.

Key Lookup

The present invention provides a means for performing a lookup of a key with a single access into a valid or transition bit field. The table can represent valid entries or ranges. While this technique is useful, as the size of the key grows, the amount of memory required becomes quite large and the method becomes increasingly inefficient. For example, a table sufficient for a 16 bit key would require 16 Kbytes of memory for the bit field and the result pointer. If this were used to represent the first 16 bits of lookup on a typical Internet IPv4 table with 40000 entries, this would provide an efficiency of 1.2 bits of memory per bit of key represented. If the lookup were extended to 20 bits, the efficiency drops to 32 bits of memory per bit of key represented. A different mechanism must therefore be used to perform lookups for larger keys.

A fast and efficient compressed radix lookup mechanism may be used with valid bit fields and transition fields. The basic approach is to start the lookup with a large bit field lookup, either valid or transition type, and follow it with lookups with smaller granularity. This is required because the top of a lookup tree is much more dense than the bottom. A reasonable approach is to start with a 16 bit lookup and follow it with several smaller lookups.

A radix 16 or compressed radix approach may be used in conjunction with the valid bit approach described above, as shown in FIG. 13. The search begins with a large radix lookup, 64K for example. The results of that lookup are additional radix 16 lookups. It will be recognized by one of ordinary skill in the art that other radix can be used, with radix 8, 32 and 64 being reasonably efficient when implemented as compressed radix trees.

Figure 13:
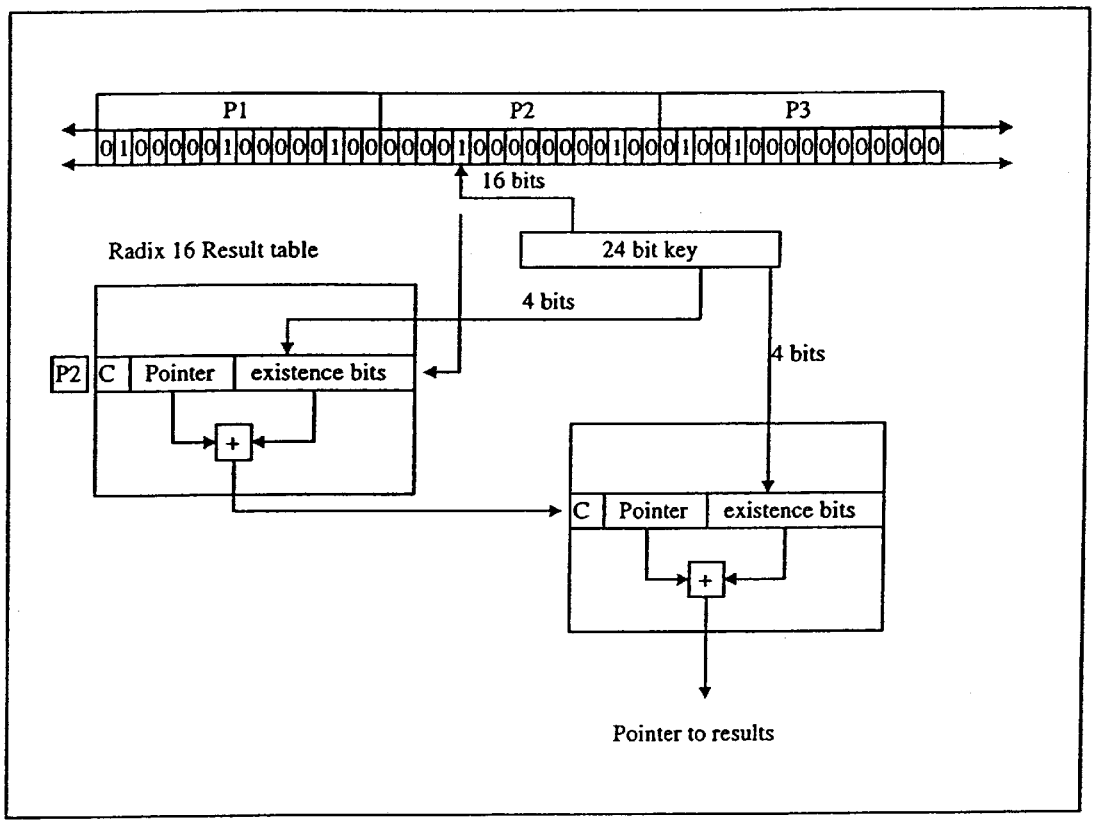
FIG. 13 shows a block diagram of a hardware implementation of a 64 Kbit valid bit table followed by radix 16 tables compatible with the present invention.

In the example shown in FIG. 13, the first 16 bits of the key are used to reference the 64K valid bit table. In the associated result table, the result entries are compressed radix 16 entries that continue the lookup of bits 16 to 19 of the key. The remaining 4 bits are looked up in another compressed radix 16 entry in another piece of memory.

Compressed Radix with Transition Fields

Figure 14:
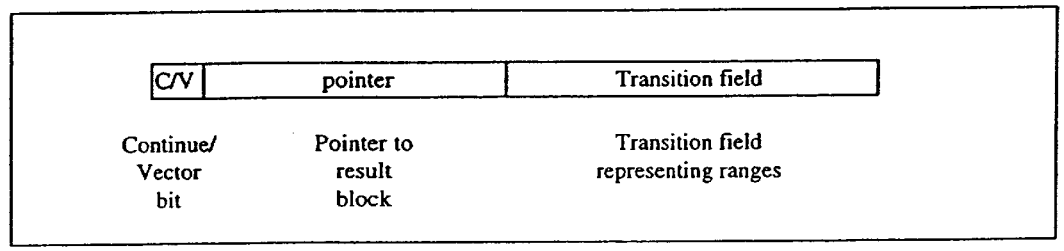
FIG. 14 shows a compressed radix with transition field format compatible with the present invention.
Figure 15:
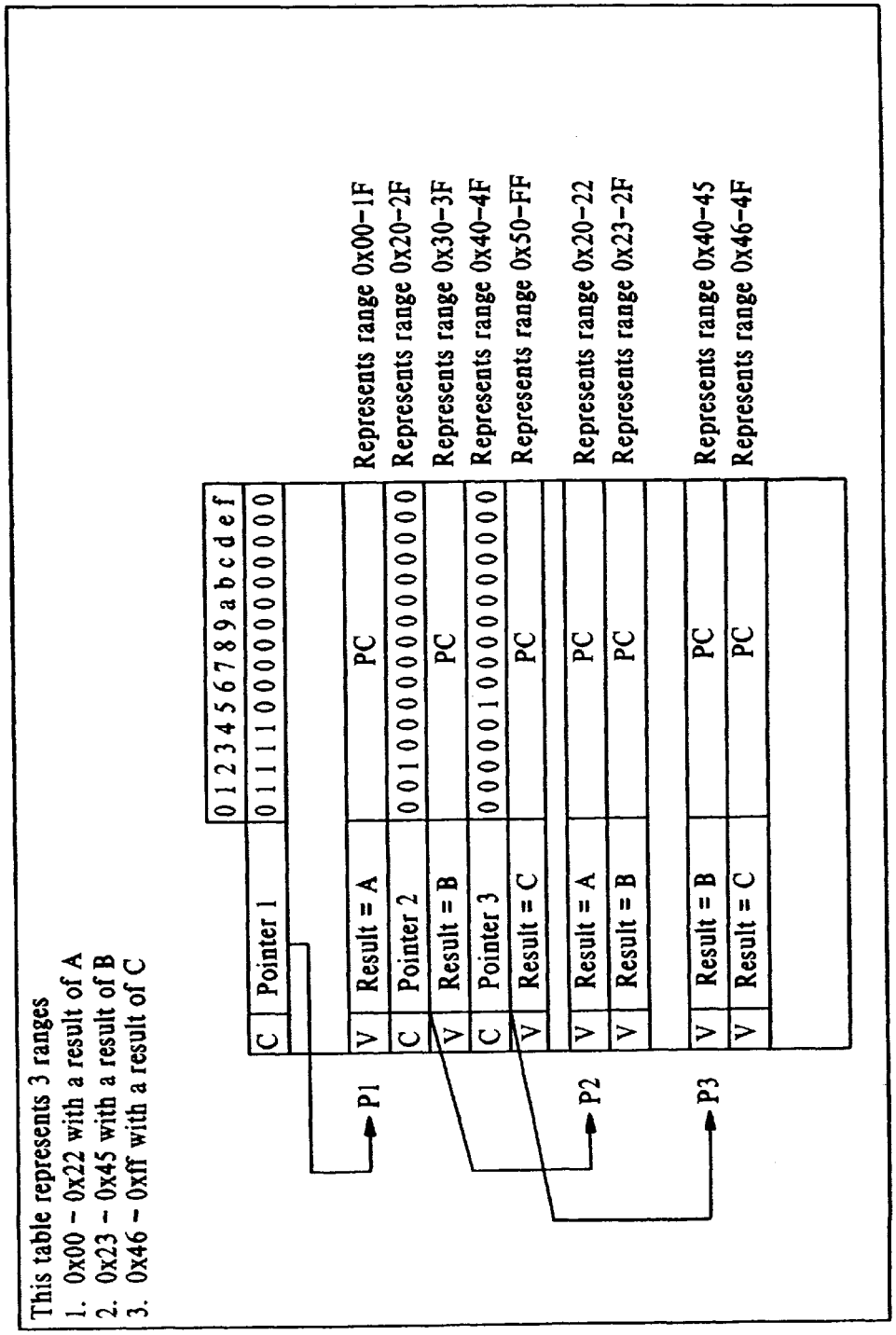
FIG. 15 shows a compressed radix tree with transition field example compatible with the present invention.
Figure 16:
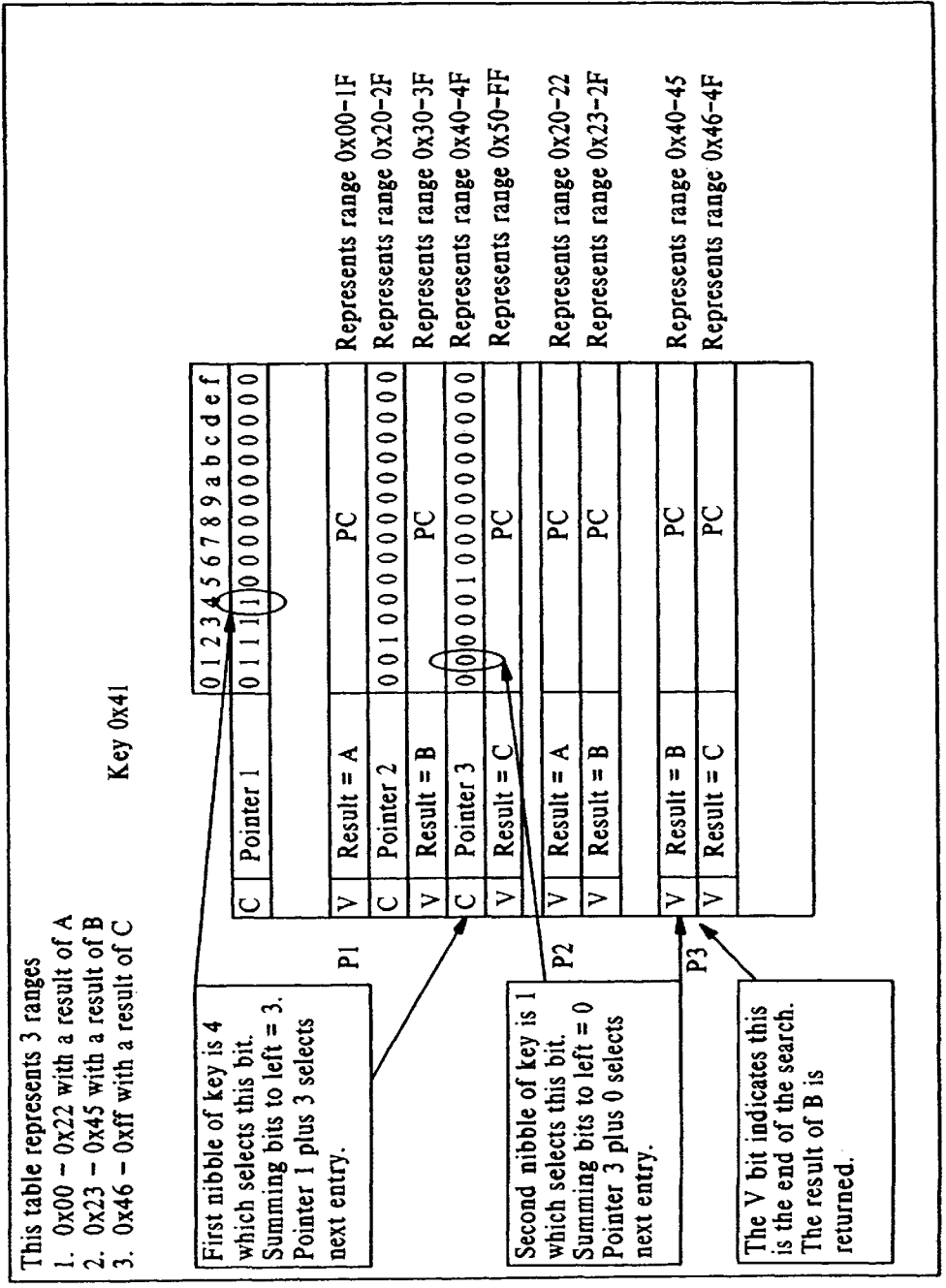
FIG. 16 illustrates an example lookup using a key of 0x 41 and the table of FIG. 15.

The valid bit representation of compressed radix tables may also be used with transition bits. The compressed radix with transition fields format is useful in representing ranges, as shown in FIG. 14. Each entry into the compressed radix table in this case has a continue/vector bit, a pointer to a next vector or a result block, and a transition field to represent of range as illustrated in FIG. 14. The use of this compressed radix format is similar to that described above with the exception of the transition field. FIG. 15 shows an example illustrating how transition fields can be used on tables for compressed radix trees to represent ranges. The example represents three ranges:

1. 0x00–0x22 with a result of A.
2. 0x23–0x45 with a result of B.
3. 0x46–0xFF with a result of C FIG. 16 shows an example of a compressed radix lookup into the table of FIG. 15 using a key of 0x 41. The first nibble of the key, being a 4, selects the bit position labeled 4 in the transition field. The transition bits to the left of the selected bit position (i.e. the lower order bit positions labeled 0–3 in FIG. 16) are summed up to obtain a value of 3. The next entry into the table is determined by adding the pointer 1 and the summation value of 3 together. This next entry has its Continue/Vector bit set to a C to indicate a continuation in the lookup sequence a pointer 3 in its pointer field. The second nibble of the key, being a 1, selects the bit position labeled 1 in the transition field. The transition bits to the left of the selected bit position (i.e. the lower order bit position labeled 0 in FIG. 16) is summed up to obtain a value of 0. The next entry into the table is determined by adding the pointer 3 and the summation value of 0 together. This next entry has its Continue/Vector bit set to a V to indicate this is the end of the search or lookup and its pointer field returns the result of B.

Most network tables must represent both specific values and ranges of values. The transition field representation is typically not the most efficient way of representing specific values as each value will require at least two results, one for the value and one for not the value. In light of this, a preferred embodiment of the present invention is able to support both the valid and transition field representations. Differentiating between the two can be accomplished with an additional bit in the entry indicating the type of entry it is, or segmenting memory and using the location in memory as an indication of the entry type.

Another method of representing both types of entries is to double the size of the transition bit field to allow two bits per transition. In this case, the bits can be encoded to mean invalid entry start or middle of range valid entry end of range.

The advantage of this encoding is that invalid entries do not need to be represented in the corresponding result block. An effect of this encoding is that it double the size of the transition field.

Larger Radix Searches

Another possible way of continuing the searches is simply to use the valid/transition bit tables described above with smaller radix values, as shown in FIG. 17. For example, a system could start with a radix 64k lookup (16 bit key) followed by a radix 256 (8 bit) lookup. The problem with this approach is that some 256 bit field may only represent one range. The memory efficiency in this case is quite low. A 256 bit field with associated pointers will require 64 bytes of memory. To reach the efficiency of the compressed radix 16 tables which has a maximum of 8 bits per bit, a radix 256 table must represent 8 entries, which is 8 bits of key * 8 keys in 64 bytes of memory.

Figure 17:
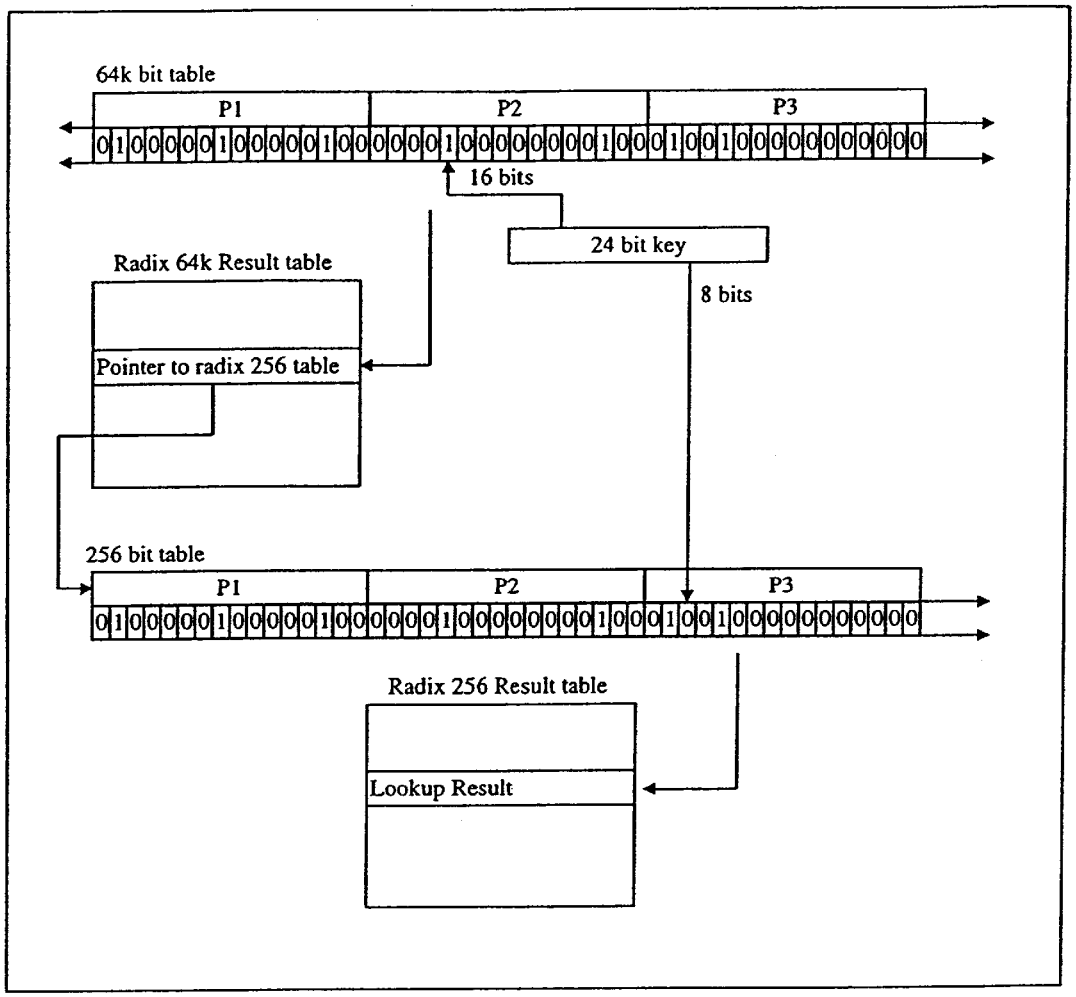
FIG. 17 shows a 64 Kbit valid bit table followed by radix 256 tables compatible with the present invention.

One method of using the longer radix tables in continuing lookups requires three memory references for a 24 bit key, as shown in FIG. 17. In this example, the first 16 bits of the key are used to reference a 64K valid/transition bit table. The result is a pointer to the beginning of a 256 bit valid/transition bit table. This table is then referenced to lookup the remaining 8 bits of the key. The result of this lookup is the result of the overall lookup. This takes three memory references to resolve the lookup, with one additional memory reference required to read the result: the first memory reference is used for the 16 bit valid field and associated pointer, the second memory reference is used for the first result table, the third memory reference is used to reference the valid field and pointer in the 256 bit table, and the fourth memory reference reads the result.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for performing a radix search tree lookup on a radix search tree of a data structure stored in a computer to obtain a result, the method comprising:

using a key as a transition index into a transition table;

using a first pointer associated with the transition index as a pointer into a first block of entries in a result table; and using a sum of transition bits in the transition table below the transition index as a result index into the first block of entries in the result table to obtain the result.

2. The method of claim 1 further comprising:

using the result index into the first block of entries to reference the result of the radix search tree lookup.

3. The method of claim 1 further comprising:

adding space in the result table to enable insertion of entries after the first block of entries.

4. The method of claim 1 further comprising:

using a second pointer to add an entry from the first block of entries in the result table into a second block of entries in the result table.

5. The method of claim 1 wherein, the sum of transition bits in the transition table below the transition index is computed using a counter.

6. The method of claim 1 wherein, the transition bits in the transition bit table indicate a range of valid search entries for a key.

7. The method of claim 1 wherein, a value of the key differentiates one or more entries in the transition table.

8. The method of claim 1 wherein, a required storage space in a memory is reduced by the transition table and a time to perform the lookup is reduced.

9. An apparatus for performing a radix search tree lookup on a radix search tree of a data structure stored in a digital computer to obtain a result, the apparatus comprising:

the digital computer having an input device and a processor, the input device to receive a key into the digital computer;

the processor to use the key as a transition index into the transition table;

the processor to use a first pointer associated with the transition index as a pointer into a first block of entries in a result table; and the processor to use a sum of transition bits in the transition table below the transition index as a result index into the first block of entries in the result table to obtain the result.

10. The apparatus of claim 9 wherein, the processor further to use the result index into the first block of entries to reference the result of the radix search tree lookup.

11. The apparatus of claim 9 wherein, the processor further to add space in the result table to enable insertion of entries after the first block of entries.

12. The apparatus of claim 9 wherein, the processor further to use a second pointer to add an entry from the first block of entries in the result table into a second block of entries in the result table.

13. An article of manufacture for use in a computer system for performing a radix search tree lookup on a radix search tree of a data structure stored in a digital computer to obtain a result, the article of manufacture comprising:

a computer usable medium having computer readable program code embodied in the medium, the computer readable program code to use a key as a transition index into a transition table;

use a first pointer associated with the transition index as a pointer into a first block of entries in a result table; and use a sum of transition bits in the transition table below the transition index as a result index into the first block of entries in the result table to obtain the result.

14. The article of manufacture of claim 13, wherein the computer readable program code further to use the result index into the first block of entries to reference the result of the radix search tree lookup.

15. The article of manufacture of claim 13, wherein the computer readable program code further to add space in the result table to enable insertion of entries after the first block of entries.

16. The article of manufacture of claim 13, wherein the computer readable program code further to use a second pointer to add an entry from the first block entries in the result table into a second block of entries in the result table.

* * * * *